(12) United States Patent
Daansen

(10) Patent No.: US 9,714,714 B2
(45) Date of Patent: *Jul. 25, 2017

(54) NOZZLE TIP WITH SLIT VALVE FOR FLUID DISPENSER

(71) Applicant: Warren S. Daansen, Summerland Key, FL (US)

(72) Inventor: Warren S. Daansen, Summerland Key, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/987,941

(22) Filed: Jan. 5, 2016

(65) Prior Publication Data

US 2016/0131267 A1    May 12, 2016

Related U.S. Application Data

(63) Continuation of application No. 14/527,263, filed on Oct. 29, 2014, now Pat. No. 9,254,498, which is a continuation of application No. 11/854,360, filed on Sep. 12, 2007, now Pat. No. 8,899,449, which is a
(Continued)

(51) Int. Cl.
| | |
|---|---|
| *A47K 5/12* | (2006.01) |
| *F16K 3/28* | (2006.01) |
| *B05B 11/00* | (2006.01) |
| *B65D 47/20* | (2006.01) |

(Continued)

(52) U.S. Cl.
CPC .............. *F16K 3/28* (2013.01); *B05B 11/007* (2013.01); *B05B 11/3042* (2013.01); *B65D 47/2031* (2013.01); *F16K 15/147* (2013.01); *F16K 47/08* (2013.01); *A47K 5/12* (2013.01); *B05B 11/3032* (2013.01)

(58) Field of Classification Search
CPC .... A47K 5/12; A47K 5/1208; B05B 11/3028; B05B 11/3035; B05B 11/3032; B05B 11/007; B05B 11/3042; B65D 47/2031; F16K 3/28; F16K 15/147; F16K 47/08
See application file for complete search history.

(56) References Cited

U.S. PATENT DOCUMENTS 2,328,382 A * 8/1943 Langdon ............... F16K 15/147
137/218
2,347,988 A * 5/1944 Burke ................... F16K 15/147
137/217
(Continued)

*Primary Examiner* — Patrick M Buechner
(74) *Attorney, Agent, or Firm* — McLane Middleton, Professional Association

(57) ABSTRACT

An outlet valve assembly for a fluid dispenser of a type having a pump fluidically coupled to a fluid reservoir includes an outlet nipple having a proximal end configured to be fluidically coupled to the pump and a distal end opposite the proximal end. The outlet nipple defines a conduit extending in a flow direction and has an annular protrusion extending radially inwardly intermediate the proximal end and the distal end. An outlet nozzle is coaxially received within the distal end of the outlet nipple. A resiliently deformable valve member is received within the conduit. The valve member includes a valve head portion having one or more slits defining an orifice and a peripheral valve portion outward of the valve head portion. The peripheral valve portion is retained between the annular protrusion of the outlet nipple and an end edge surface of the outlet nozzle.

20 Claims, 13 Drawing Sheets

Related U.S. Application Data continuation-in-part of application No. 11/220,018, filed on Sep. 6, 2005, now abandoned.

(60) Provisional application No. 60/608,239, filed on Sep. 9, 2004.

(51) Int. Cl.
*F16K 15/14* (2006.01)
*F16K 47/08* (2006.01)

(56) References Cited

U.S. PATENT DOCUMENTS

| | | | |
|---|---|---|---|
| 2,524,764 A * | 10/1950 | Burke | F16K 15/147 137/217 |
| 2,598,002 A * | 5/1952 | Langdon | F16K 15/147 137/218 |
| 2,642,259 A * | 6/1953 | Catlin | F16K 15/147 137/515.7 |
| 2,662,724 A * | 12/1953 | Kravagna | F16K 15/147 137/847 |
| 2,670,757 A * | 3/1954 | Delany | F16K 15/147 137/515 |
| 3,118,468 A * | 1/1964 | Bochan | F16K 15/147 137/846 |
| 3,160,329 A | 12/1964 | Radic et al. | |
| 3,220,611 A | 11/1965 | Zander et al. | |
| 3,485,419 A | 12/1969 | Taylor | |
| 3,504,699 A | 4/1970 | Grisé | |
| 4,143,853 A * | 3/1979 | Abramson | A61M 39/26 137/515.7 |
| 4,155,487 A | 5/1979 | Blake | |
| 4,621,749 A * | 11/1986 | Kanfer | A47K 5/1215 222/153.01 |
| 4,646,945 A | 3/1987 | Steiner et al. | |
| 4,991,745 A | 2/1991 | Brown | |
| 4,993,452 A * | 2/1991 | Hough | F01N 3/025 137/515.7 |
| 5,071,017 A | 12/1991 | Stull | |
| 5,105,997 A | 4/1992 | Wakabayashi et al. | |
| 5,115,950 A | 5/1992 | Rohr | |
| 5,213,236 A | 5/1993 | Brown et al. | |
| 5,271,531 A | 12/1993 | Rohr et al. | |
| 5,339,995 A | 8/1994 | Brown et al. | |
| 5,377,877 A | 1/1995 | Brown et al. | |
| 5,409,144 A | 4/1995 | Brown | |
| 5,439,143 A | 8/1995 | Brown et al. | |
| 5,464,125 A | 11/1995 | Daansen | |
| 5,501,372 A * | 3/1996 | Daansen | B67D 7/0205 222/181.3 |
| 5,531,363 A | 7/1996 | Gross et al. | |
| 5,626,262 A | 5/1997 | Fitten et al. | |
| 5,655,687 A | 8/1997 | Fitten et al. | |
| 5,676,289 A | 10/1997 | Gross et al. | |
| 5,680,969 A | 10/1997 | Gross | |
| 5,730,336 A | 3/1998 | Lerner | |
| 5,743,443 A | 4/1998 | Hins | |
| 5,788,108 A | 8/1998 | Rohr | |
| 5,839,614 A | 11/1998 | Brown | |
| 5,897,033 A | 4/1999 | Okawa et al. | |
| 5,904,275 A | 5/1999 | Suffa | |
| 5,911,344 A | 6/1999 | Kieras | |
| 5,927,567 A | 7/1999 | Fillmore | |
| 5,938,086 A | 8/1999 | Gross | |
| 6,006,960 A | 12/1999 | Gross | |
| 6,045,004 A | 4/2000 | Elliott | |
| 6,053,194 A | 4/2000 | Nelson et al. | |
| 6,062,435 A | 5/2000 | Hess, III | |
| 6,065,642 A | 5/2000 | Brown | |
| 6,089,411 A | 7/2000 | Baudin et al. | |
| 6,089,419 A | 7/2000 | Gross | |
| 6,095,381 A | 8/2000 | Schwanenberg | |
| 6,095,382 A | 8/2000 | Gross | |
| 6,112,952 A | 9/2000 | Hess, III et al. | |
| 6,142,343 A | 11/2000 | Wade et al. | |
| 6,152,330 A | 11/2000 | Polan | |
| 6,186,374 B1 | 2/2001 | Gross | |
| 6,189,740 B1 | 2/2001 | Wade et al. | |
| 6,199,725 B1 | 3/2001 | Garibaldi | |
| 6,213,355 B1 | 4/2001 | Schwanenberg | |
| 6,216,916 B1 | 4/2001 | Maddox et al. | |
| 6,223,956 B1 | 5/2001 | Albers | |
| 6,230,940 B1 | 5/2001 | Manning et al. | |
| 6,273,296 B1 | 8/2001 | Brown | |
| 6,273,305 B1 | 8/2001 | Fioravanti et al. | |
| 6,279,783 B1 | 8/2001 | Brown et al. | |
| 6,286,732 B1 | 9/2001 | Daansen | |
| 6,293,437 B1 | 9/2001 | Socier et al. | |
| 6,298,554 B1 | 10/2001 | Fuchs | |
| 6,325,253 B1 | 12/2001 | Robinson | |
| 6,394,315 B1 | 5/2002 | Banks | |
| 6,394,316 B1 | 5/2002 | Daansen | |
| 6,405,901 B1 | 6/2002 | Schantz et al. | |
| 6,427,874 B2 | 8/2002 | Brown et al. | |
| 6,446,844 B1 | 9/2002 | Gross | |
| 6,530,504 B2 | 3/2003 | Socier | |
| 6,543,652 B1 | 4/2003 | Kelder et al. | |
| 6,612,468 B2 | 9/2003 | Pritchett et al. | |
| 6,616,016 B2 | 9/2003 | Hicks et al. | |
| 6,619,512 B1 * | 9/2003 | Sayers | A47K 5/1207 222/181.3 |
| 6,672,479 B2 | 1/2004 | Shiraishi et al. | |
| 6,705,492 B2 | 3/2004 | Lowry | |
| 6,732,889 B2 | 5/2004 | Oren et al. | |
| 6,749,092 B2 | 6/2004 | Olechowski et al. | |
| 7,784,652 B2 | 8/2010 | Gaus et al. | |
| 7,806,301 B1 | 10/2010 | Ciavarella et al. | |
| 8,490,839 B2 | 7/2013 | Mihashi et al. | |
| 8,899,449 B2 | 12/2014 | Daansen | |
| 9,254,498 B2 * | 2/2016 | Daansen | B05B 11/007 |
| 2002/0130139 A1 | 9/2002 | Shiraishi et al. | |
| 2002/0158083 A1 | 10/2002 | Brown et al. | |
| 2005/0087555 A1 | 4/2005 | Hatton et al. | |
| 2006/0049208 A1 | 3/2006 | Daansen | |
| 2007/0080177 A1 | 4/2007 | Hatton et al. | |
| 2008/0035677 A1 | 2/2008 | Daansen | |
| 2015/0048121 A1 | 2/2015 | Daansen | |

\* cited by examiner

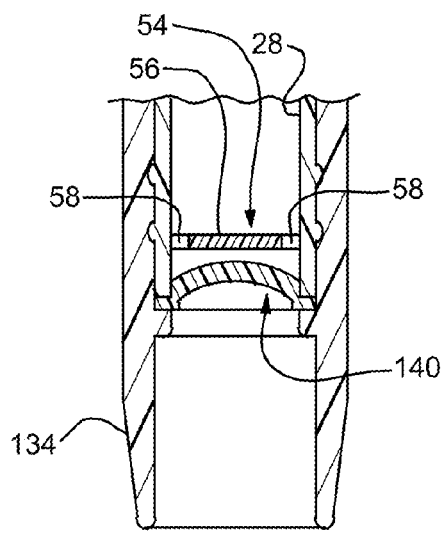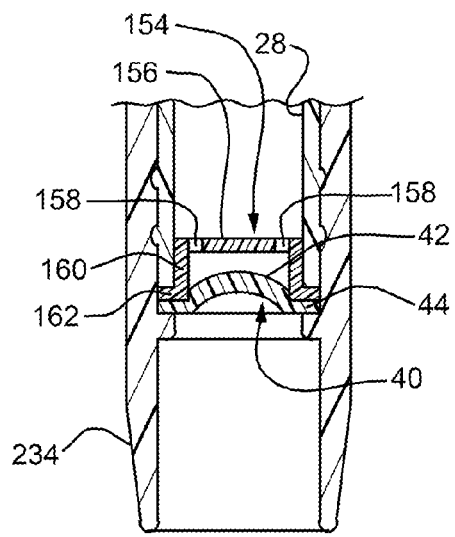
FIG. 16    FIG. 17
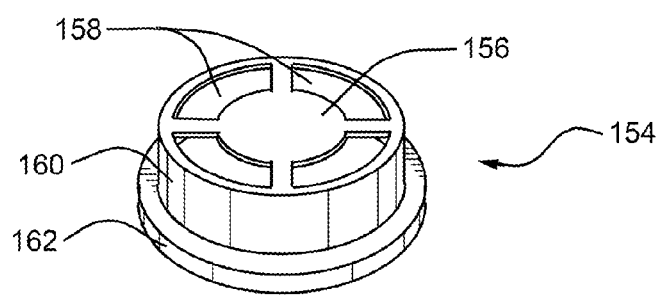
FIG. 18
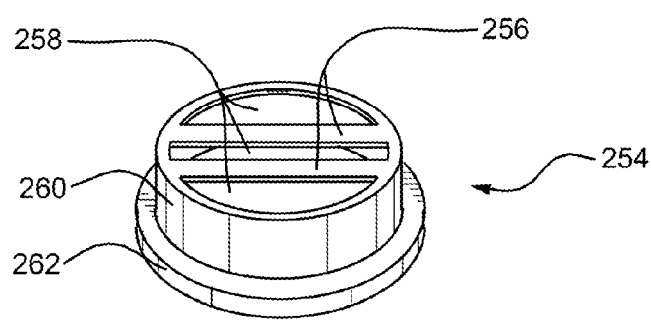
FIG. 19

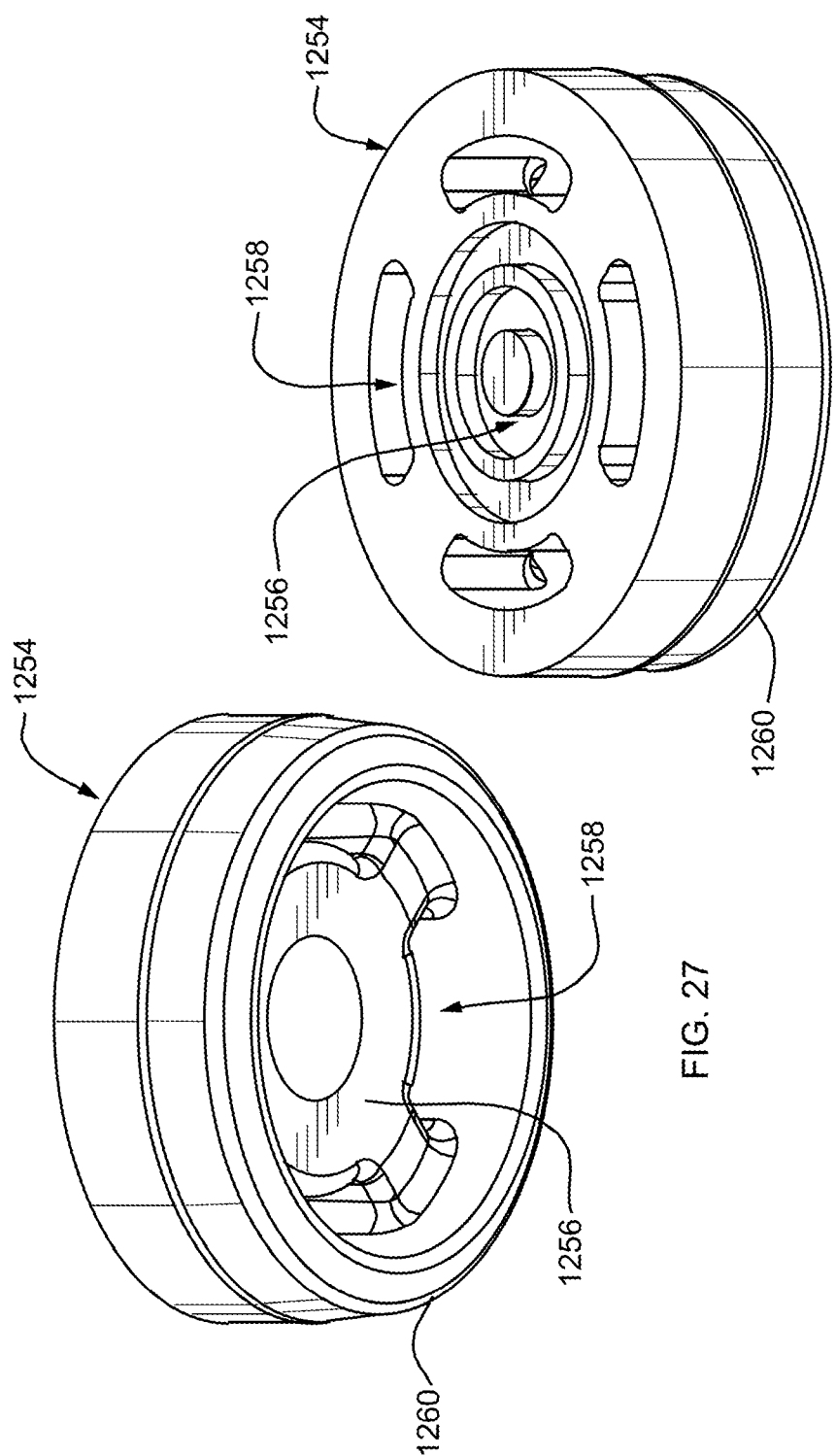

NOZZLE TIP WITH SLIT VALVE FOR FLUID DISPENSER

CROSS-REFERENCE TO RELATED APPLICATIONS

This application is a continuation of application Ser. No. 14/527,263, filed Oct. 29, 2014, now pending, which is a continuation of application Ser. No. 11/854,360, filed Sep. 12, 2007, now U.S. Pat. No. 8,899,449, which is a continuation-in-part of U.S. patent application Ser. No. 11/220,018, filed Sep. 6, 2005, now abandoned, which, in turn, claimed priority under 35 U.S.C. §119(e) to U.S. provisional application Ser. No. 60/608,239, filed Sep. 9, 2004. Each of the aforementioned applications is incorporated herein by reference in its entirety.

BACKGROUND

The present disclosure relates to improved dispenser valves for a fluid dispenser and dispensing nozzle or pump tips employing the same. The valves and nozzle tip assembly in accordance with the present development may advantageously be employed in connection with a dispenser of a bag-in-a-box type and will be described herein primarily by way of reference thereto. However, it will be recognized that the valve and nozzle tip may also be used in connection with all manner of fluid types and fluid dispensers. In a preferred embodiment, the present disclosure relates to an improved liquid pump tip assembly for fluid dispenser and, specifically, to a tip assembly which utilizes an interiorly received resiliently flexible valve. In a further aspect, liquid dispensers incorporating the same are provided.

Liquid and semi-liquid dispensers are used in numerous applications and are used to dispense metered portions of soaps, creams, lotions, gels, and similar flowable materials. Such dispensers are commonly found in public restrooms, medical facilities, or the like and may be manually operated or may be powered units which may operate automatically, e.g., under preprogrammed control in response to sensory input.

Commonly, bag-in-box dispensing systems include a housing, such as a wall-mounted housing, and a disposable or reusable dispensing system. The disposable dispensing system includes a disposable pump assembly coupled to a flexible, collapsible bag or a semi rigid, unvented, bottle containing a supply of product to be dispensed. The reusable dispensing system includes a rigid or semi rigid refillable reservoir that is vented to the atmosphere and fitted with a pump as described herein. Although a wide variety of pump mechanisms have been developed, they generally include a resiliently flexible or deformable chamber having an inlet fluidically coupled to the bag or other container and a dispensing outlet having a spring loaded valve.

The spring loaded valve is normally closed and includes a spring and ball within the flow passageway, wherein the spring urges a ball into sealing engagement with the pump outlet. Commonly, the chamber is of a tube-type having a resiliently collapsible pump tube with its first end coupled to the bag or other container and the second end coupled to a pump tip for accurately dispensing a quantity of fluid, e.g., into the hand of a user.

In the tube-type pumps, the pump tip includes a ball and spring check valve in which a ball is seated against the inlet of the tip by a spring. In operation, the tube is compressed and the fluid moves the ball out of the seated position, compressing the spring, and thereby allowing the fluid to be dispensed to flow around the ball and through the tip. A one-way valve may be provided at the first tube end to prevent soap in the tube from reentering the bag or other container when the tube is compressed. Such dispensers are described in the present applicant's prior U.S. Pat. Nos. 6,286,732, 5,598,952, 5,501,372, and 5,464,125, each of which is incorporated herein in its entirety.

Another type of pump is a so-called bubble, dome, or disc pump wherein the resiliently flexible chamber is hemispherical or dome shaped, and may be of the type described in my prior U.S. Pat. No. 6,394,316, which is incorporated herein by reference in its entirety.

In operation, a lever or other actuator on the housing is depressed to collapse the deformable chamber to increase the pressure in the chamber. The increased pressure in the chamber displaces the ball and liquid passes through the pump outlet, around the ball, and is expelled. When the actuator is released, the chamber returns from the collapsed state to its original volume, thereby decreasing the pressure within the chamber, thereby causing the ball to return to the seated position and to draw an additional charge of product from the bag or other container into the chamber.

A one-way check valve may also be provided at the dispensing pump inlet to permit flow from the bag into the collapsible chamber, but to prevent product in the chamber from flowing back into the bag or other container when the actuator is depressed. For example, a ball may be held in close proximity to the pump inlet via a perforated retainer. When the pressure in the chamber increases, the ball is seated against the pump inlet, thereby preventing flow of product from the chamber back into the bag. While the chamber returns to its original volume, the reduced pressure unseats the check ball and allows product to pass from the bag or other container, through the pump inlet and around the ball through the perforated ball retainer. In the disposable dispensing system, the bag or non-vented semi-rigid container collapses upon itself, thereby maintaining constant pressure within the bag. In the reusable dispensing system, the rigid or semi rigid container is vented to maintain balance between internal and atmospheric pressures and, as such, does not collapse during evacuation.

A common problem with the ball and spring dispenser valves is that they tend to clog and become unusable, particularly when liquid product containing particulate matter is used, or for highly viscous liquids.

In FIG. 29, there is shown a known dispenser tip incorporating a resiliently flexible cross-slit valve 1340 instead of the conventional ball and spring check valve. The dispenser tip includes a body 1334, a tube coupling 1335, and an integrally formed, perforated internal baffle 1354. The cross-slit valve 1340 is retained within an outlet end 1337 of the dispenser tip on the downstream side of the perforated baffle 1354. An external retainer ring 1339 is secured to the outlet end 1337 to secure a peripheral portion 1344 of the valve 1340 within the tip outlet end 1337 between the ring 1339 and an interior shoulder 1341. In one embodiment, a snap fit engagement of the retainer ring 1339 within the tip outlet end 1337 was found by the present applicant to exhibit unacceptable levels of stress cracks and splitting. In a further embodiment, the snap fit engagement between the retainer ring 1339 within the tip outlet end 1337 was replaced with an ultrasonic weld; however, this process adds expense and has shown other problems including excessive weld flash.

Accordingly, a need exists for an effective pump tip assembly incorporating a flexible, resilient valve with an internally applied retainer ring that solves the above-referenced problems, is easy to manufacture, and lowers production cost.

SUMMARY

In one aspect, an improved outlet valve assembly for fluid dispenser of a type having a pump which has a pump inlet coupled to a fluid reservoir and a pump outlet is provided. The valve assembly includes a pump tip having a first end adapted to be coupled to the pump outlet and a second end defining a conduit extending in a flow direction therebetween. A first annular protrusion extends radially inwardly within the conduit and a resiliently deformable valve member is received within the conduit. The valve member includes a valve head portion having one or more slits defining an orifice and a peripheral valve portion bounding the valve head portion, which is retained on the first annular protrusion. A vent-resisting member is received within the conduit and includes a perforated baffle adjacent to the upstream side of the valve head portion and an axially-extending sidewall which has a distal edge engaging the peripheral valve portion.

In another aspect, an outlet valve assembly for a fluid dispenser of a type having a pump fluidically coupled to a fluid reservoir is provided. The outlet valve assembly includes an outlet nipple having a proximal end configured to be fluidically coupled to the pump and a distal end, the outlet nipple defining a conduit extending in a flow direction. An outlet nozzle comprises a sleeve and an annular protrusion extending radially inwardly, the sleeve and annular protrusion cooperating to define a counterbore. The counterbore coaxially receives at least a portion of the outlet nipple. A resiliently deformable valve member is received within the counterbore and includes a valve head portion having one or more slits defining an orifice and a peripheral valve portion around the valve head portion. The peripheral valve portion is retained between the annular protrusion of the outlet nozzle and the distal end of the outlet nipple. The valve head portion has a first side and a second side opposite the first side, the first side being upstream of the second side in the flow direction. A vent-resisting member is integrally formed within the conduit defined by the outlet nipple conduit, the vent-resisting member including a perforated baffle adjacent the first side of the valve head portion, wherein the baffle is positioned sufficiently close to the first side of the valve head portion so as to resist inward opening of the orifice during operation to prevent inward venting of ambient air during a dispensing operation.

In further aspects, fluid dispensers employing the outlet valve assemblies according to this disclosure are provided.

BRIEF DESCRIPTION OF THE DRAWINGS

The invention may take form in various components and arrangements of components, and in various steps and arrangements of steps. The drawings, wherein like reference numerals refer to like or analogous components throughout the several views, are only for purposes of illustrating preferred embodiments and are not to be construed as limiting the invention.

FIGS. 16 and 17 are cross-sectional views of exemplary embodiments employing a vent-resisting baffle.

FIG. 18 is an enlarged perspective view of the vent-resisting baffle shown in FIG. 17.

FIG. 19 is a perspective view of an alternative baffle member embodiment.

FIGS. 27 and 28 are isometric views, taken generally from below and above, respectively, of the retaining member.

DETAILED DESCRIPTION OF THE PREFERRED EMBODIMENTS

Figure 1:
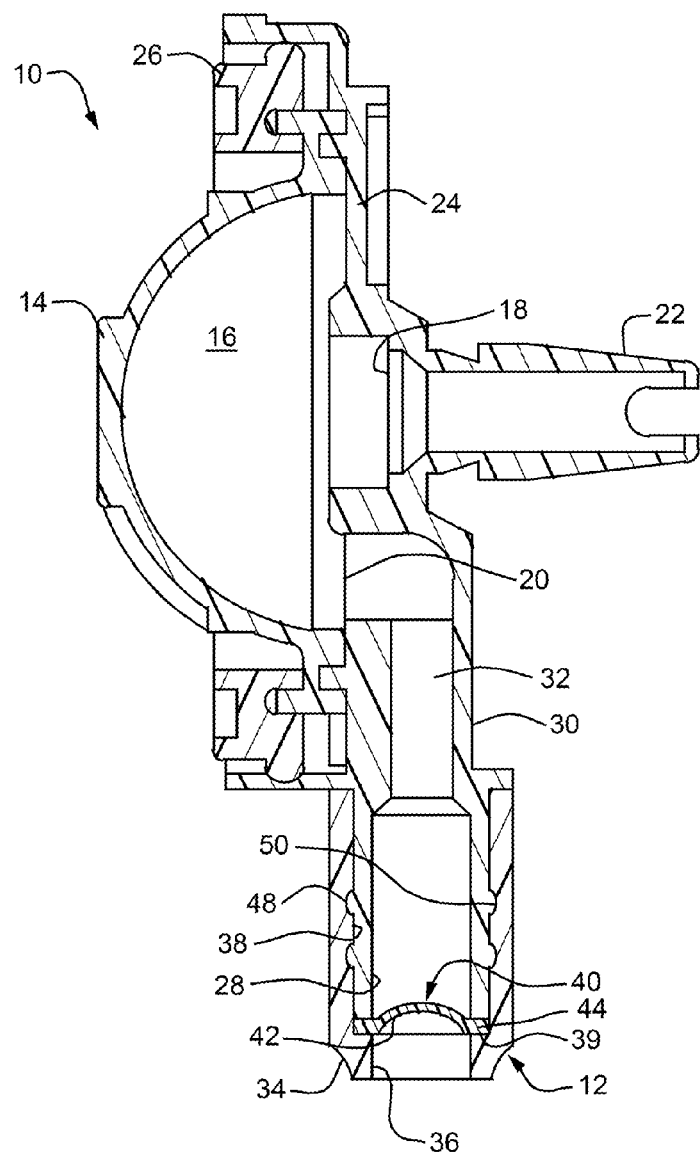
FIG. 1 side cross-sectional view of a dispensing pump for a fluid dispenser incorporating a nozzle outlet assembly according to an exemplary embodiment of the present invention.

Referring now to FIG. 1, there appears an exemplary embodiment of a pump assembly 10 incorporating an outlet valve assembly 12 according to the present invention. The pump assembly 10 includes a resiliently flexible dome or bubble 14 defining a reservoir or chamber 16 for holding a charge of product to be dispensed. Exemplary fluids to be dispensed include, without limitation, liquid soap, shampoo, body wash, hand cream solutions, lotions or lotion soaps, gels, shaving cream, hand sanitizers, or any other flowable liquid.

The chamber 16 includes an inlet 18 and an outlet 20. The inlet 18 of the chamber 16 is fluidically coupled to a source of product, preferably a flexible bag (not shown) containing the product to be dispensed via an inlet nipple 22. The preferred bag-in-box embodiment is a closed system and venting is unnecessary, since pressure in the bag is maintained as the bag collapses upon itself.

A one-way valve, such as a ball (not shown) held in close proximity to the inlet 18 via a perforated retainer (not shown) may be provided to prevent fluid from passing from the chamber 16 back into the inlet nozzle 18 during operation. The hemispherical bubble 14 is secured to a cavity back wall 24 via a retaining ring 26. The chamber outlet 20 is fluidically coupled a pump outlet nipple 28 via a conduit 30 defining a flow passageway 32.

An outlet valve assembly 12 includes an outlet nozzle 34 having an axial bore or channel 36 therein and a counterbore 38, and which is coaxially aligned with the outlet nipple 28. A slit valve 40 is seated in the counterbore 38, which defines a sleeve portion for receiving the outlet nipple 28 and an internal stop or shoulder 39. The valve 40 includes a valve head or membrane portion 42 which is bounded by a peripheral sealing edge or flange 44. The peripheral edge 44 is compressed between the end edge surface of the outlet nozzle 28 and the base of the counterbore portion 38 of the outlet nozzle 12 to provide a sealing engagement and prevent fluid from flowing around the valve member 40. Although the valve assembly is shown in connection with a dome-type pump, it will be recognized that the nozzle assembly may be used other pump types, such as tube-type pumps and others.

Figure 2:
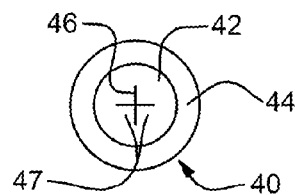
FIG. 2 is a top plan view of the valve member shown in FIG. 1.

As best seen in FIG. 2, and with continued reference to FIG. 1, the valve head portion 42 includes one or more slits 46 forming an orifice and defining flexible flaps 47. The membrane 42 is formed of a resiliently flexible material, such as flexible plastic, rubber, elastomers, silicone rubber, and the like. Exemplary resilient or flexible materials which may be used in making the valve member include, for example, polyurethane, polyisoprene, polybutadiene, neoprene, butadiene-acrylonitrile copolymers, ethylene-butadiene block copolymers, ethylene-propylene based copolymers including ethylene propylene diene terpolymer (EPDM), natural rubber, polychloroprene rubber, polyisoprene-isobutylene copolymers, silicone rubber, styrene-acrylonitrile copolymers, styrene-butadiene copolymers, styrene-isoprene copolymers, styrene-maleic anhydride copolymers, fluoroelastomers, polyolefins, and so forth, as well as blends thereof. This list is intended to be illustrative rather than limiting. The resiliency of the valve head maintains the flaps 46 in the closed position, thereby preventing fluid flow therethrough until the fluid pressure reaches some threshold value, i.e., when the dispenser actuator is depressed, whereupon the flaps 46 separate and the product is expelled through the valve orifice 46.

The outlet nipple 28 is coaxially or telescopically received within the counterbore 38 of the outlet nozzle 34. The inner diameter of the counterbore region 38 and the outer diameter of the outlet nipple 28 are sized to provide a friction or interference fit therebetween. The outlet nipple 28 outer surface and the counterbore 38 inner surface may optionally include aligned and mating or complimentary surface features. For example, in the depicted embodiment, the outlet nipple 28 includes raised annular ribs or protrusions 48 which engage complimentary annular channels or depressions 50 formed in the counterbore region 38. The complimentary surface features 48 and 50 provide a snap fit between the nozzle outlet 34 and the nipple outlet 28 and ensure sufficient compression of the peripheral edge 44 to prevent fluid from flowing therearound during operation. Alternatively, the respective positions of the complimentary protrusions and depressions could be reversed. Other methods for securing the pump outlet nipple 28 and the connector sleeve portion of the nozzle 34 include the use of an adhesive, cross-hatching, texturing, or other surface modification of the counterbore 38 inner surface and/or outlet 28 outer surface, providing complimentary helical threads for rotational engagement, and so forth.

The nozzle outlet 34 may additionally include one or more exterior surface features (not shown) such as projections, fins, particular geometric shape, etc., which provides a keying function to ensure proper installation of the pump within the dispenser and/or to enable the pump assembly 10 to be keyed to fit a specific dispenser pump of like or mating configuration. The use of a separately attachable nozzle outlet 34 allows a common pump assembly to be readily adapted to fit any desired key configuration by installing an appropriately keyed nozzle outlet.

Figure 3:
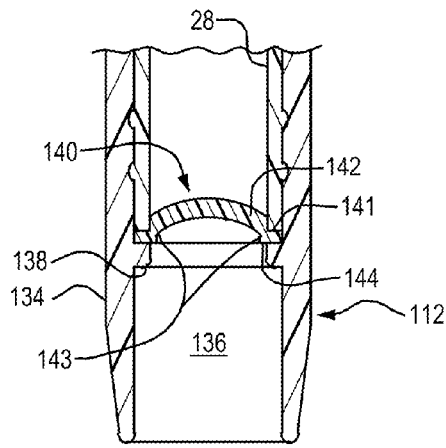
FIGS. 3-6 are cross-sectional views of nozzle outlet assemblies according to further exemplary embodiments.
Figure 20:
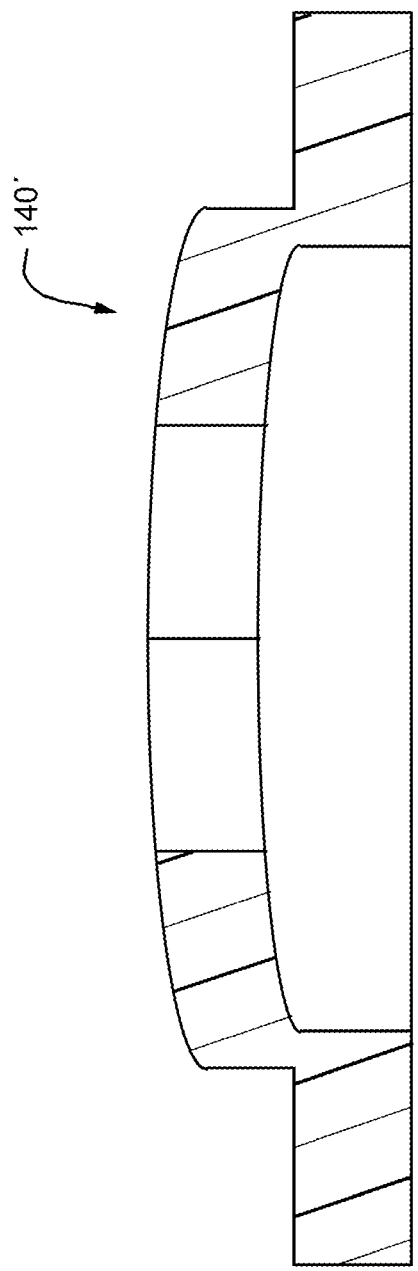
FIG. 20 is an enlarged view of a cross-slit valve similar to the valve appearing in FIG. 3.

Referring now to FIG. 3, there is shown an alternative outlet nozzle assembly 112 including an outlet nozzle 134 defining an axial bore 136 and an annular protrusion 138 forming an internal stop member which extends radially into the bore 136. The pump outlet nipple 28 is telescopically received within the axial bore 136 of the outlet nozzle 134. The inner diameter of the nozzle 136 and the outer diameter of the outlet nipple 28 are sized to provide a friction or interference fit. A valve member 140 includes a valve head portion 142 and peripheral edge 144 as detailed above and the peripheral edge 144 is sealingly retained between the end of the outlet nipple 28 and the annular ring 138. An enlarged view of an alternative valve 140' similar to the valve 140 appears in FIG. 20.

In the embodiment depicted in FIG. 3, the outlet nipple 28 outer surface and the outlet nozzle 134 inner surface may include optional aligned and mating surface features, e.g., raised annular ribs or protrusions 48 which engage complimentary annular channels or depressions 50, as described above.

The peripheral flange portion 144 of the valve member 140 as shown in FIG. 3 is defined on the inward facing surface thereof by an peripheral annular notch 141 formed on the inward facing surface of the valve member 140 which is adapted to receive the distal end of the outlet nipple 28. This permits sealing engagement of the edge 144 without distortion of the valve head member. In the embodiment of FIG. 3, the annular notch 141 also serves to define a region 143 of reduced cross-sectional thickness with increased flexibility and/or articulability, thereby reducing the pressure necessary to cause the valve 140 to open.

Figure 4:
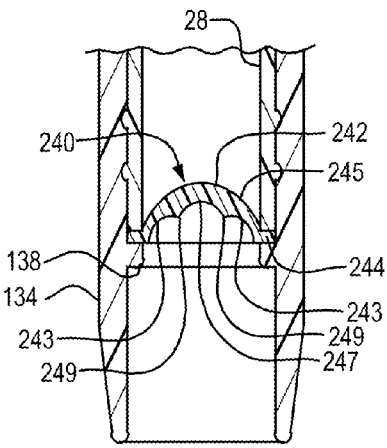

Referring now to FIG. 4, there is shown a nozzle assembly 212 including a nozzle outlet 134 having an inwardly extending retaining ridge 138 and which telescopically engages a pump outlet nipple 28. The nozzle assembly 212 additionally includes a valve 240. The valve 240 according to a further embodiment of the present invention includes a peripheral flange portion 244 bounding a valve head portion 242. The flange portion 244 is sealingly retained between the outlet nipple 28 and the ridge 138. The valve head portion 242 includes an inward or upstream facing surface 245 and exterior or downstream facing surface 247 which is opposite the surface 245. The inwardly facing surface 245 is convex and the exterior facing surface 247 is generally concave and cusped in cross-sectional shape. That is, the interior surface 247 cross-sectional shape is defined by a series of curves or arcs defining regions of reduced thickness 243 and cusps 249 defining regions of increased thickness. The regions of reduced thickness 243 increase the flexibility and/or articulability of the valve 240 and reduce the pressure necessary to cause the valve 240 to open.

Figure 5:
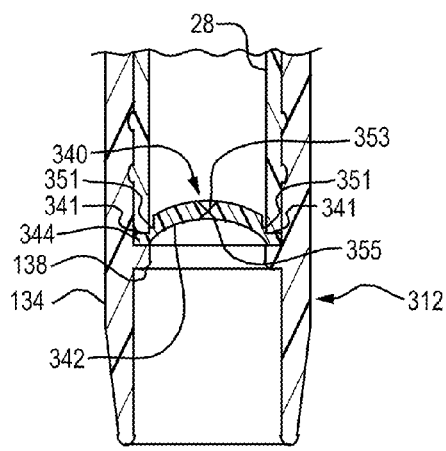

Referring now to FIG. 5, there appears a nozzle assembly 312 including a nozzle outlet 134 having an inwardly extending retaining ridge 138 and which telescopically engages a pump outlet nipple 28. The nozzle assembly 312 additionally includes a valve 340. The valve 340 according to yet a further embodiment of the present invention includes a peripheral flange portion 344 bounding a valve head portion 342. The flange portion 344 is sealingly retained between the outlet nipple 28 and the ridge 138. The valve 340 includes a peripheral annular notch 341 receiving the distal end of the pump outlet nipple 28. A second annular notch or groove 351 is disposed on the valve head portion 342, radially inward from the peripheral notch 341. The notch 351 defines a region of reduced valve head thickness, thereby increasing the flexibility and/or articulability of the valve and reducing the pressure necessary to cause the valve to open and fluid to be expelled. The valve head portion 342 also includes a first generally conical cavity 353 formed in the inward facing surface thereof and a second generally conical cavity 355 formed in the exterior facing surface of the valve head 342. The conical cavities 353, 355 are axially aligned with the slits forming the valve orifice, with the apexes thereof being aligned and facing, whereby the thickness of the displaceable flaps is tapered toward the center of the orifice. This reduced thickness at the orifice reduces the pressure necessary to cause the flaps to open and expel the fluid therethough. The conical cavities described by way of reference to FIG. 3 and elsewhere herein may be replaced with other geometric configurations, such as frustoconical, pyramidical, frustopyramidical, and so forth.

Figure 6:
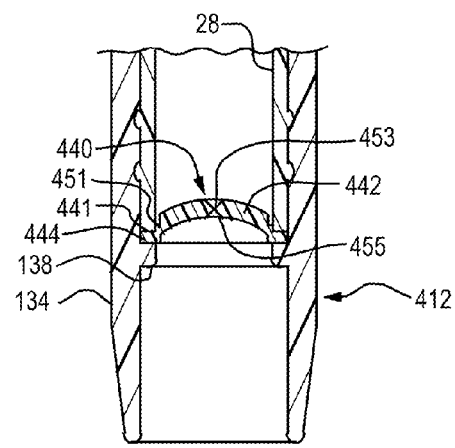

Referring now to FIG. 6, there appears an outlet valve assembly 412 including a nozzle outlet 134 having an inwardly extending retaining ridge 138 and which telescopically engages a pump outlet nipple 28. The nozzle assembly 412 additionally includes a valve 440. The valve 440 according to still a further embodiment of the present invention includes a peripheral flange portion 444 bounding a valve head portion 442. The flange portion 444 is sealingly retained between the outlet nipple 28 and the ridge 138. The base surface 459 of the flange 444 engages the ridge 138 and extends beyond the ridge 138 in the radially inward direction. The valve 440 includes a peripheral annular notch 441 receiving the distal end of the pump outlet nipple 28. A second annular notch or groove is disposed on the valve head portion 442 radially inward from the peripheral notch 441. The notch 451 defines a region of reduced valve head thickness, thereby increasing the flexibility and/or articulability of the valve, thereby reducing the pressure necessary to cause the valve to open. The valve head portion 442 also includes a first generally conical cavity 453 formed in the inward facing surface thereof and a second generally conical cavity 455 formed in the exterior facing surface of the valve head 442. The conical cavities 453, 455 are axially aligned with the slits forming the valve orifice, with the apexes thereof being aligned and facing, whereby the thickness of the displaceable flaps is tapered toward the center of the orifice. This reduced thickness at the orifice reduces the pressure necessary to cause the flaps to open and expel the fluid therethough.

Figure 7:
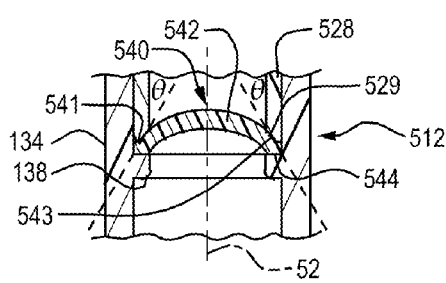
FIGS. 7 and 8 are fragmentary cross-sectional views of a nozzle outlet in accordance with still further exemplary embodiments of the present invention.

Referring now to FIG. 7, there is shown a fragmentary view of an outlet nozzle assembly 512, including a nozzle outlet 134 having an inwardly extending retaining ridge 138 and which telescopically engages a pump outlet nipple 528. The nozzle assembly 512 additionally includes a valve 540. The valve 540 according to another embodiment of the present invention includes a peripheral flange portion 544 bounding a valve head portion 542. The flange portion 544 is sealingly retained between the outlet nipple 528 and the ridge 138. The peripheral flange portion 544 is defined on the inward facing surface thereof by a peripheral annular notch 541 which is adapted to receive the distal end of the outlet nipple 528. The outlet nipple 528 includes a distal end 529, which is tapered or beveled on its radially inward edge. The angle, theta, of the bevel is preferably in the range of about 5-60 degrees, and preferably about 25-45 degrees, relative to the axial or flow direction 52. The annular notch 541 also serves to define a region 543 of reduced cross-sectional thickness with increased flexibility and/or articulability, thereby reducing the pressure necessary to cause the valve 540 to open during operation.

Figure 8:
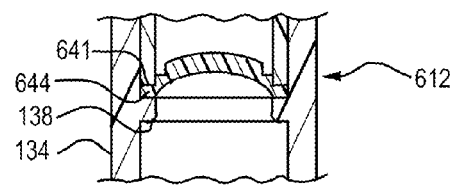

Referring now to FIG. 8, there is shown a fragmentary view of a nozzle assembly 612 including a nozzle outlet 134 having an inwardly extending retaining ridge 138 and which telescopically engages a pump outlet nipple 28. The nozzle assembly 612 additionally includes a valve 640. The valve 640 is substantially as shown and described above by way of reference to the valve 340 shown in FIG. 5, except that the conical cavities in the valve head orifice region are omitted. A peripheral flange portion 644 bounds a valve head portion 642. The flange portion 644 is sealingly retained between the outlet nipple 28 and the ridge 138. The valve 640 includes a peripheral annular notch 641 receiving the distal end of the pump outlet nipple 28. A second annular notch or groove 651 is disposed on the valve head radially inward from the peripheral notch 641. The notch 651 defines a region of reduced valve head thickness, thereby increasing the flexibility and/or articulability of the valve and reducing the pressure necessary to cause the valve to open and fluid to be expelled.

Figure 9:
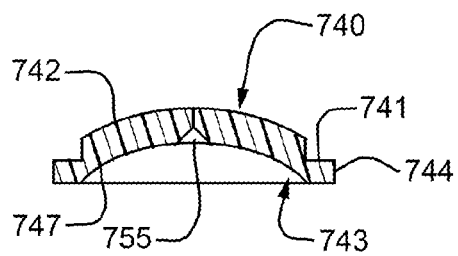
FIGS. 9-15 are cross-sectional views of some additional exemplary valves according to the present invention.

Referring now to FIG. 9, there is shown a valve member 740 according to another embodiment of the present invention. The valve 740 includes a peripheral flange portion 744 bounding a valve head portion 742. The valve 740 includes a peripheral annular notch 741 for receiving the distal end of the pump outlet nipple 28 (see FIGS. 1-8). The notch 741 further defines a region 743 of reduced valve head thickness, thereby increasing the flexibility and/or articulability of the valve, and thereby reducing the pressure necessary to cause the valve to open. The valve head portion 742 also includes a generally conical cavity 755 formed in an exterior facing surface 747 of the valve head 742. The conical cavity 755 is axially aligned with the slits forming the valve orifice, with the apex in the depicted embodiment extending roughly one-half of the cross sectional thickness of the valve head portion 742. In this manner, the thickness of the displaceable valve flaps is tapered toward the center of the orifice and reduces the pressure necessary to cause the flaps to open and expel the fluid therethough. The degree of taper and/or degree to which the conical cavity extends through the cross-sectional thickness of the valve head portion may be varied in accordance with the product to be dispensed.

Figure 10:
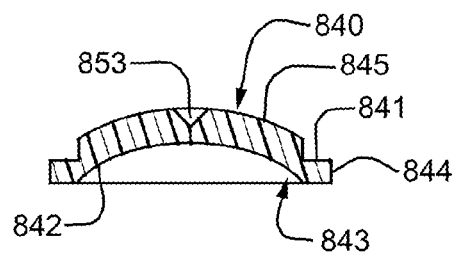

Referring now to FIG. 10, there is shown a valve member 840 according to still another embodiment of the present invention. The valve 840 includes a peripheral flange portion 844 bounding a valve head portion 842. The valve 840 includes a peripheral annular notch 841 for receiving the distal end of the pump outlet nipple 28 (see FIGS. 1-8). The notch 841 further defines a region 843 of reduced valve head thickness, thereby increasing the flexibility and/or articulability of the valve, and thereby reducing the pressure necessary to cause the valve to open. The valve head portion 842 also includes a generally conical cavity 853 formed in an interior-facing surface 845 of the valve head 842. The conical cavity 853 is axially aligned with the slits forming the valve orifice, with the apex in the depicted embodiment extending roughly one-half of the cross sectional thickness of the valve head portion 842. In this manner, the thickness of the displaceable valve flaps is tapered toward the center of the orifice and reduces the pressure necessary to cause the flaps to open and expel the fluid therethough. Again, the degree of taper and/or degree to which the conical cavity extends through the cross-sectional thickness of the valve head portion may be varied in accordance with the product to be dispensed.

Figure 11:
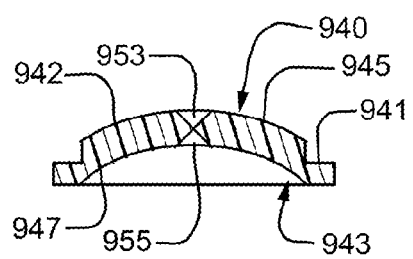
Figure 12:
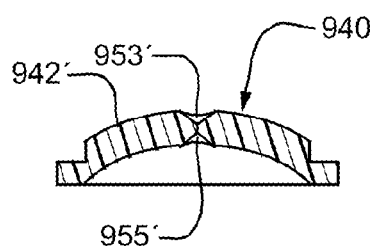

Referring now to FIG. 11, there is shown a valve 940 according to a further embodiment of the present invention including a peripheral flange portion 944 bounding a valve head portion 942. The valve 940 includes a peripheral annular notch 941 for receiving the distal end of a pump outlet nipple 28 (see FIGS. 1-8) and defining a region 943 of reduced valve head thickness, thereby increasing the flexibility and/or articulability of the valve and reducing the pressure necessary to cause the valve to open. The valve head portion 942 also includes a first generally conical cavity 953 formed in the inward facing surface 945 thereof and a second generally conical cavity 955 formed in the exterior facing surface 947 thereof. The conical cavities 953, 955 are axially aligned with the slits forming the valve orifice, with the apexes thereof being aligned and facing, whereby the thickness of the displaceable flaps is tapered toward the center of the orifice. This reduced thickness at the orifice reduces the pressure necessary to cause the flaps to open and expel the fluid therethough. FIG. 12 illustrates a valve 940' essentially as described above by way of reference to the valve 940 in FIG. 11, but wherein cavities 953' and 955' are of differing taper and extend to a lesser degree through the valve head 942' in the axial direction.

Figure 13:
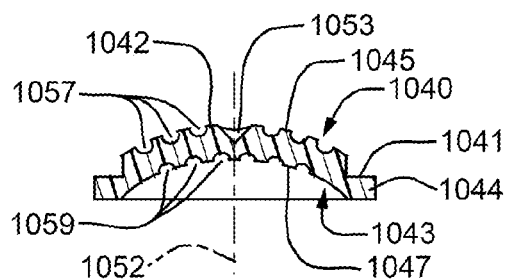
Figure 14:
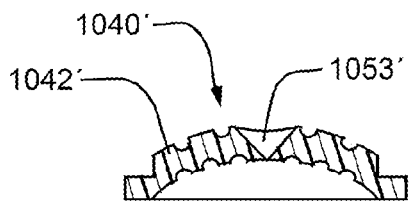

Referring now to FIG. 13, there appears an outlet valve 1040 according to another embodiment of the present invention having a peripheral flange portion 1044 bounding a valve head portion 1042. The valve 440 includes a peripheral annular notch 1041 receiving the distal end of the pump outlet nipple 28 (see FIGS. 1-8). A series of concentric annular notches or grooves 1057 are formed on the inward facing surface 1045 of the valve head 1042. The annular channels 1057 are concentric with an axial centerline 1052 of the valve 1040. Likewise, a series of annular notches or grooves 1059 concentric with the centerline 1052 are formed on the outward facing surface 1047 of the valve head 1042. The notch 1051, the channels 1057, and the channels 1059 provide regions of reduced valve head thickness, thereby increasing the flexibility and/or articulability of the valve, thereby reducing the pressure necessary to cause the valve to open. The valve head portion 1042 also includes a first generally conical cavity 1053 formed in the interiorly facing surface 1045. In the depicted embodiment, the generally conical cavity 1053 is axially aligned with the slits forming the valve orifice and extends through the majority of the valve head cross-sectional thickness. In this manner, the thickness of the displaceable flaps is tapered toward the center of the orifice to reduce the pressure necessary to cause the flaps to open. FIG. 14 illustrates a valve 1040' essentially as described above by way of reference to the valve 1040 in FIG. 13, but wherein cavity 1053' is of differing taper and extends to a lesser degree through the valve head 1042' in the axial direction.

Figure 15:
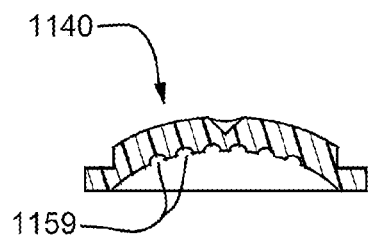

In the embodiments depicted in FIGS. 13 and 14, the concentric annular grooves are depicted on both the interior and exterior valve head surfaces. In further embodiments, the annular grooves may be present on either the exterior surface only. For example, in FIG. 15, a valve head 1140 is shown having annular grooves 1159 formed on the exterior facing surface only. In a further embodiment (not shown), a like valve head is provided with annular grooves formed only on the interior facing surface. Although the depicted embodiments illustrate concentric channels having curved, e.g., semicircular cross-sectional shapes, it will be recognized that other cross-sectional shapes are contemplated, such as V-shaped, rectangular, or other geometric cross-sectional shape.

The valve members of the present invention are preferably sufficiently resistant to flow in the reverse direction so as to resist venting of ambient air into the pump when the reduced pressure is present in the chamber 16, i.e., after product has been dispensed and the actuator has been released. Ambient air is potentially contaminated and, in some cases, may degrade the product to be dispensed.

Referring now to FIG. 16, an outlet valve assembly 134 includes a vent resistant member 54 located adjacent to an interior facing surface of a valve member 140. The vent resistant member 54 includes a generally disc-shaped baffle 56 having radially spaced-apart perforations 58 at its periphery. During operation, product flows through the perforations 58 and through the valve orifice. After the product is expelled and reduced pressure is present in the chamber 16, the baffle central portion 56 prevents opening of the valve flaps in the inward direction, thereby preventing ingress of ambient air through the valve member. The perforated baffle 54 may be integrally formed or comolded with the outlet nipple 28 or may be separately formed and secured in place via an adhesive or other fastening means.

Referring now to FIGS. 17 and 18, an outlet valve assembly 234 incorporating an alternative vent-resistant member 154 is shown. The vent-resisting member 154 is located adjacent to an interior facing surface of a valve member 140 having a valve head portion 142 and peripheral sealing edge 144. The vent resistant member 154 includes a generally disc-shaped baffle 156 having radially spaced-apart perforations 158 at its periphery, an axially extending annular sidewall 160, and a peripheral flange 162. The peripheral flange 160 is retained along with the valve sealing edge 144 between the distal end of the outlet nipple 28 and the annular protrusion 138.

Referring now to FIG. 19, there is shown an alternative vent-resisting member 254 including transversely extending bars or baffles 256 defining perforations 258. The vent-resistant member 254 also includes an axially extending annular sidewall 260 and a peripheral retaining flange 262. In operation, the baffles 256 are adjacent to the inward facing surface of the valve member to prevent the valve flaps from opening inwardly, thereby preventing venting of ambient air following a dispensing operation.

Figure 21:
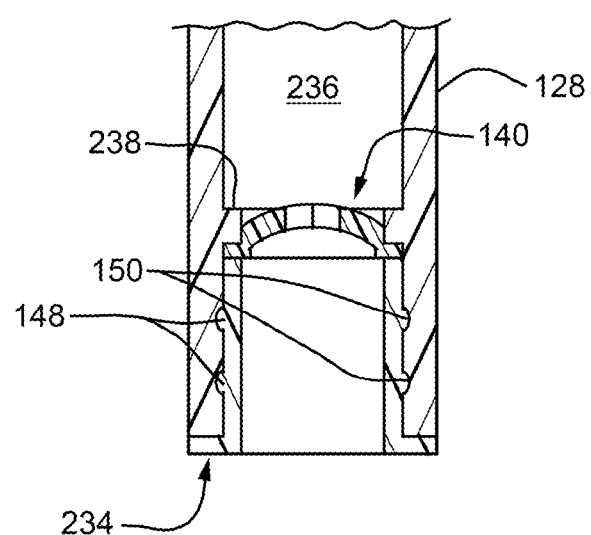
FIG. 21 is a cross-sectional view of an alternative outlet nozzle assembly.
Figure 22:
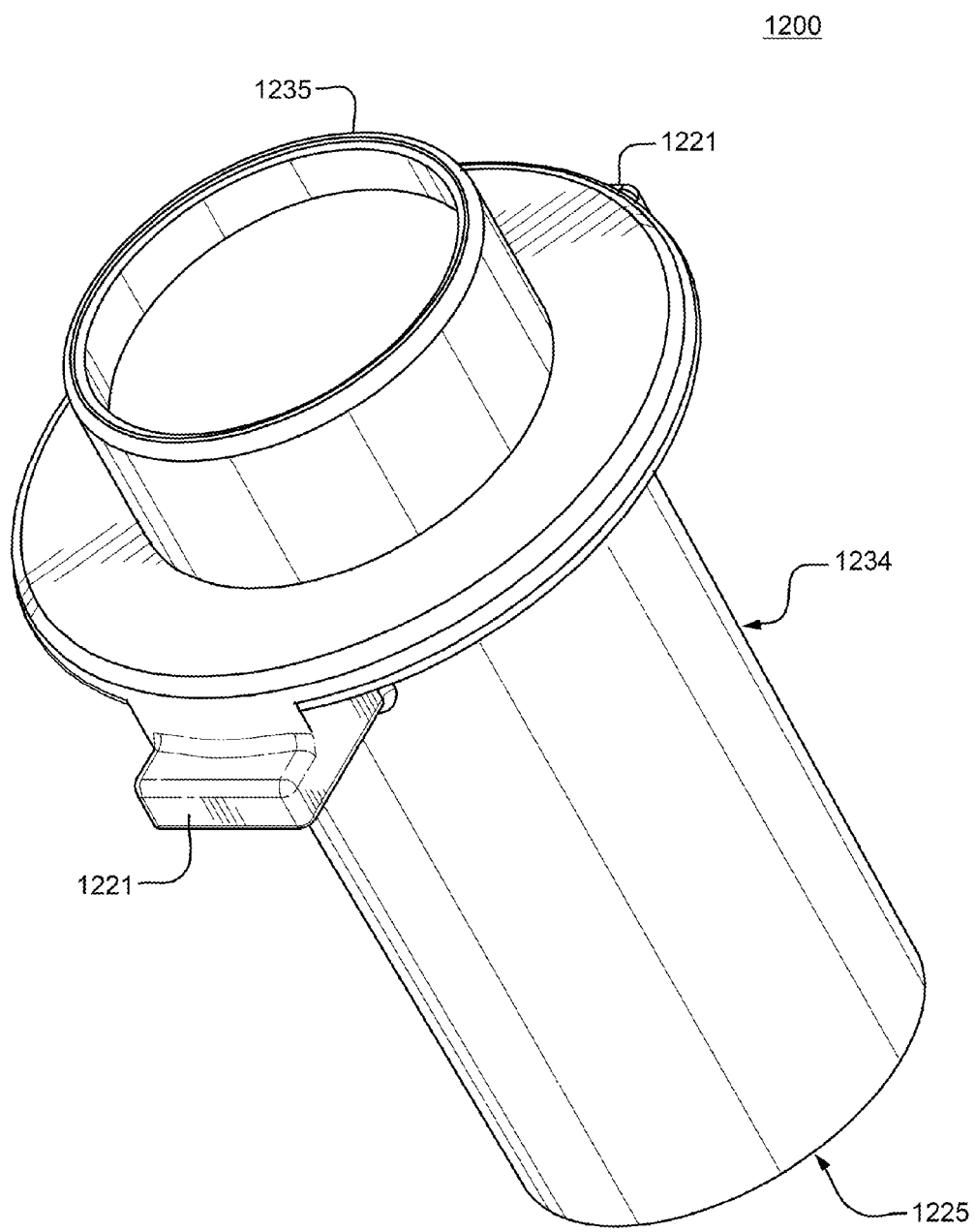
FIG. 22 is an isometric view, taken generally from above, of an exemplary embodiment nozzle tip having an internal vent-resisting member for retaining the valve within the nozzle tip.
Figure 23:
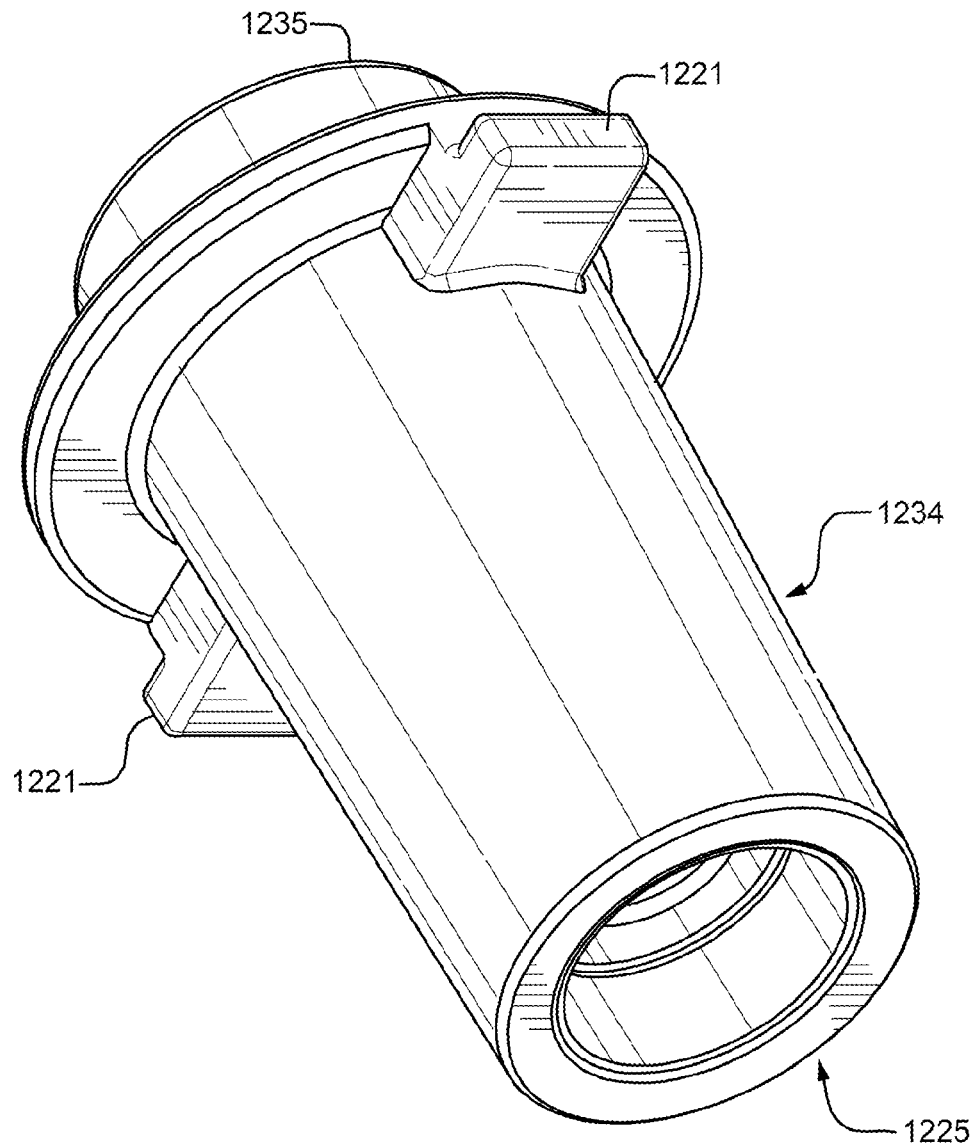
FIG. 23 is an isometric view of the embodiment appearing in FIG. 22, taken generally from below.
Figure 24:
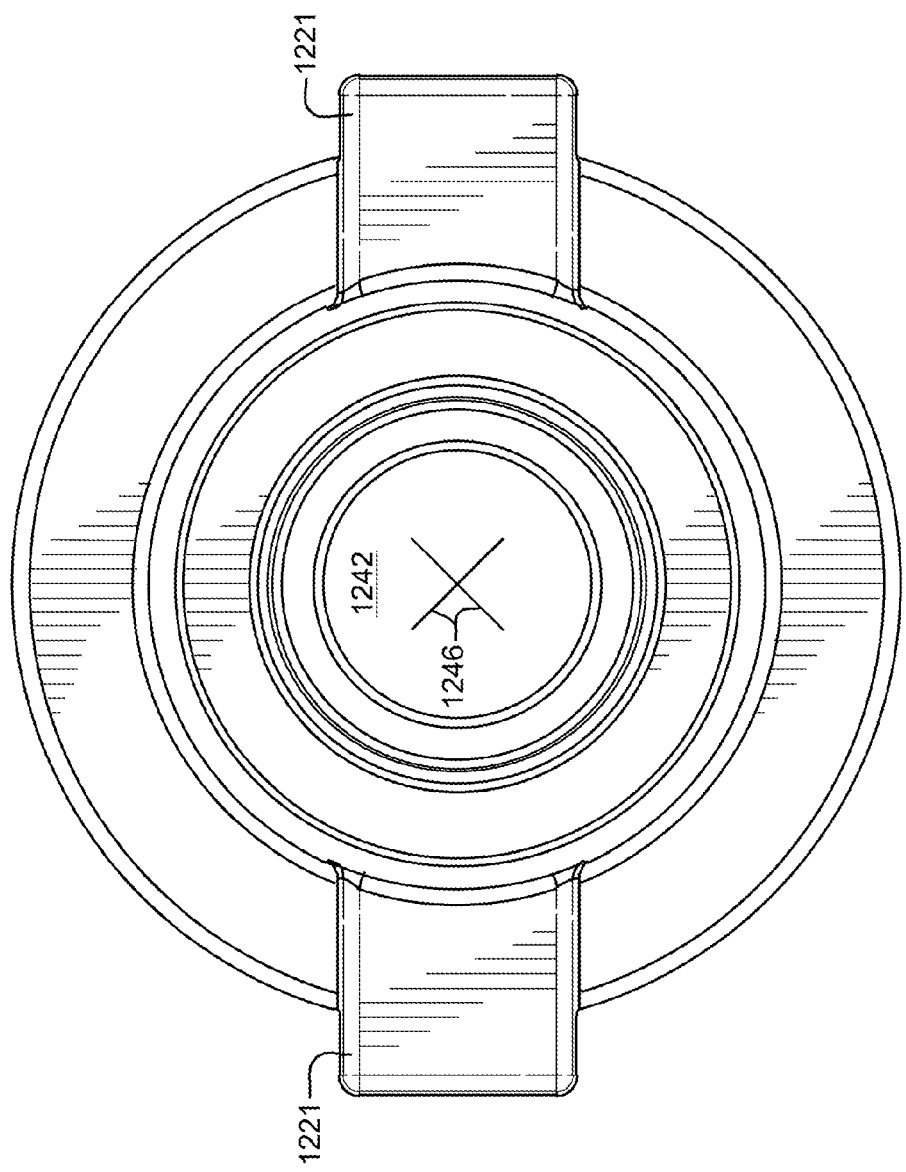
FIGS. 24 and 25 are bottom and top views, respectively, of the embodiment appearing in FIG. 22.
Figure 25:
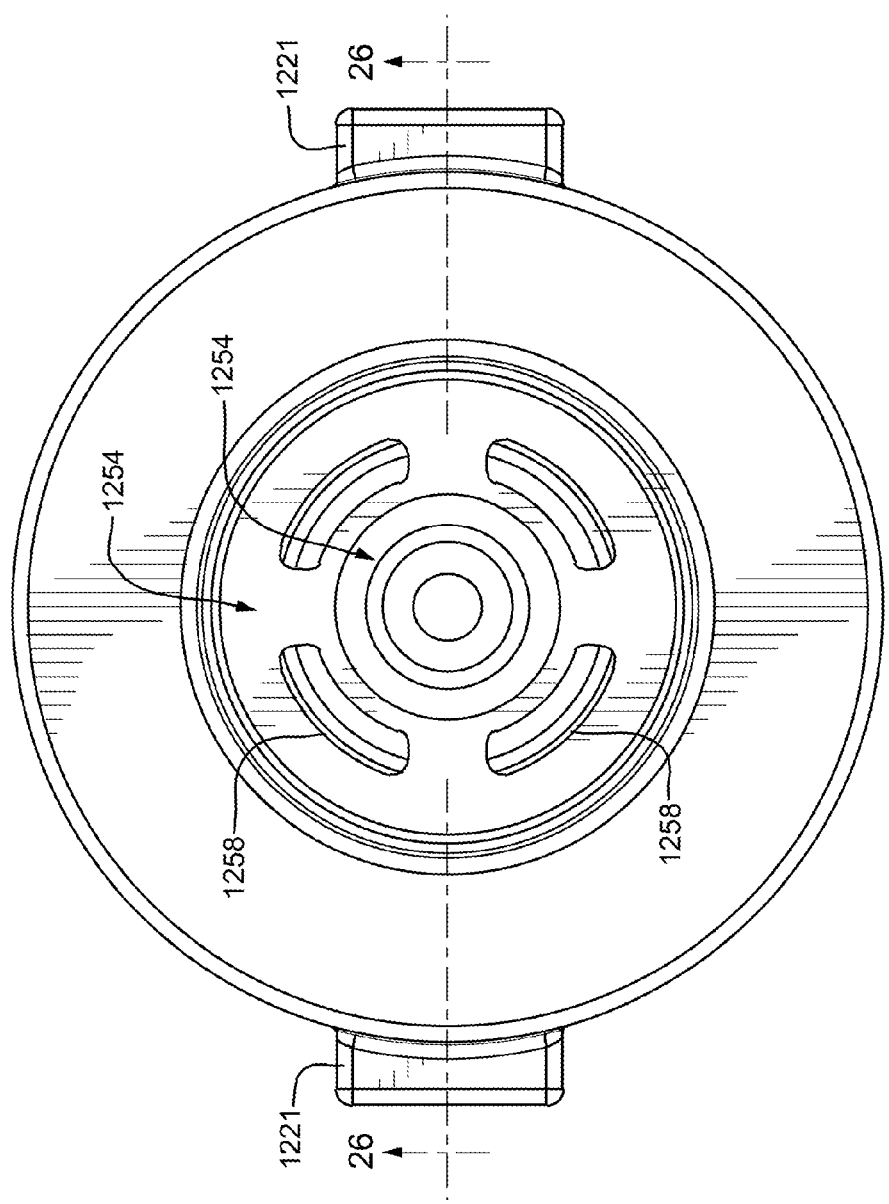

Referring now to FIG. 21, there appears an alternative outlet nozzle assembly including a male outlet nozzle 234 received within a pump outlet nipple 128 defining an axial bore 236. The pump outlet 128 includes an annular protrusion 238 forming an internal stop member which extends radially into the bore 236. The pump outlet nipple 128 coaxially receives the outlet nozzle 234 within the axial bore 236 of the outlet nipple 128. The inner diameter of the nipple 128 and the outer diameter of the outlet nozzle 234 are sized to provide a friction or interference fit. In the depicted embodiment, a valve member 140 is sealingly retained between the end edge surface of the outlet nozzle 234 and the annular ring 238.

The outlet nozzle 234 and the pump outlet 128 may be secured via a friction fit or any of the methods described above. In the embodiment depicted in FIG. 21, the outlet nozzle 234 outer surface and the outlet nipple 128 inner surface include optional aligned and mating surface features as detailed above, e.g., raised annular ribs or protrusions 148 formed on the nozzle 234 outer surface which engage complimentary annular channels or depressions 150 on the outlet nipple surface inner surface. Alternatively, the relative positions of the protrusions 148 and channels 150 may be reversed. It will be recognized that the embodiment of FIG. 21 may be adapted to employ other valve and/or internal stop configurations as described herein. Likewise, it will be recognized that the embodiment of FIG. 21 may be adapted to employ the vent-resistant members as detailed above, either by directly securing the same to the interior surface of the pump outlet or by providing a vent-resistant member having a retaining flange, e.g., as shown in FIGS. 18 and 19, wherein the retaining flange is retained between the valve peripheral sealing ring and the internal stop member 238.

Referring now to FIGS. 22-28, there is shown a pump tip for a fluid dispenser, indicated generally as 1200. The pump tip 1200 is preferably of a type for use with a tube-type pump dispenser although it will be appreciated that the pump tip 1200 shown may also be adapted for use with other pump types, such as a dome pump of the type shown in FIG. 1.

The pump tip 1200 includes a nozzle 1234, and outwardly extending tabs 1221 adapted to interface with a pump dispenser housing. It will be recognized that alternate tabs or other surface features may be provided which mate with complimentary or keyed features on the dispenser housing to accept lateral insertion of the pump tip while supporting and retaining the pump tip 1200 from downward movement.

An upper or inlet end 1235 of the pump tip 1200 is provided for coaxial and fluidic coupling with a pump tube (not shown). A narrowed diameter region or inward flange 1223 at an outlet end 1225 of the pump tip 1200 defines a shoulder 1227.

A resiliently flexible cross-slit valve 1240 includes a valve head or membrane portion 1242 having one or more slits 1246 and is bounded by a peripheral sealing edge or flange 1244. The depicted valve 1240 may be of the type shown, for example, in U.S. Pat. Nos. 5,213,236, 5,339,995, 5,377,877, 5,409,144, 5,439,143, 5,839,614, 5,890,621, 5,927,566, 5,944,234, 5,971,232, 6,112,951, 6,112,952, and 6,112,806. Each of the aforementioned patent documents is incorporated herein by reference in its entirety. Such valves are available from Liquid Molding Systems, Inc., of Midland, Mich. Alternatively, any of the aforementioned valves shown and described above by way of reference to FIGS. 1-21 may be employed.

The valve 1240 is preferably seated near the outlet end of the nozzle 1234. Shortening the distance between the valve and the nozzle outlet reduces the surface area of the nozzle inner surface that is downstream of the valve. This reduced surface area for material collection, in turn, reduces the likelihood of material buildup, "jamming," stalactite formation, dripping, or deflected shots.

The peripheral edge 1244 of the valve 1240 is retained on the shoulder 1227 by a vent-resistant member 1254 having a central, generally disc-shaped baffle 1256 and a plurality of openings 1258 therearound. An axially extending annular sidewall 1260 extends downward (in the orientation shown in FIG. 26) therefrom. The peripheral valve edge 1244 is retained between the shoulder 1227 and the axially-extending sidewall 1260. Alternative vent-resisting baffle configures are also contemplated and may be as shown in FIGS. 17-19. In still further embodiments, a rigid retaining ring, e.g., wherein the central vent-resisting baffle portion 1256 is omitted.

In constructing the pump tip 1200, the valve 1240 and vent-resistant member 1254 are inserted into the nozzle from the upper end 1235. The vent-resisting member 1254 may be retained within the nozzle 1234 via a friction fit, or, more preferably via a snap fit engagement. In the depicted preferred embodiment, the member 1254 is urged past an annular rib 1261 which is formed on the interior surface 1263 of the nozzle 1234 and provides a snap fit retention of the member 1254. In the depicted embodiment, the rib 1261 engages the upper edge of the vent-resisting baffle. Alternately, a snap fit engagement may be provided by means of a complimentary peripheral groove or depression adapted to receive the rib 1261.

Figure 26:
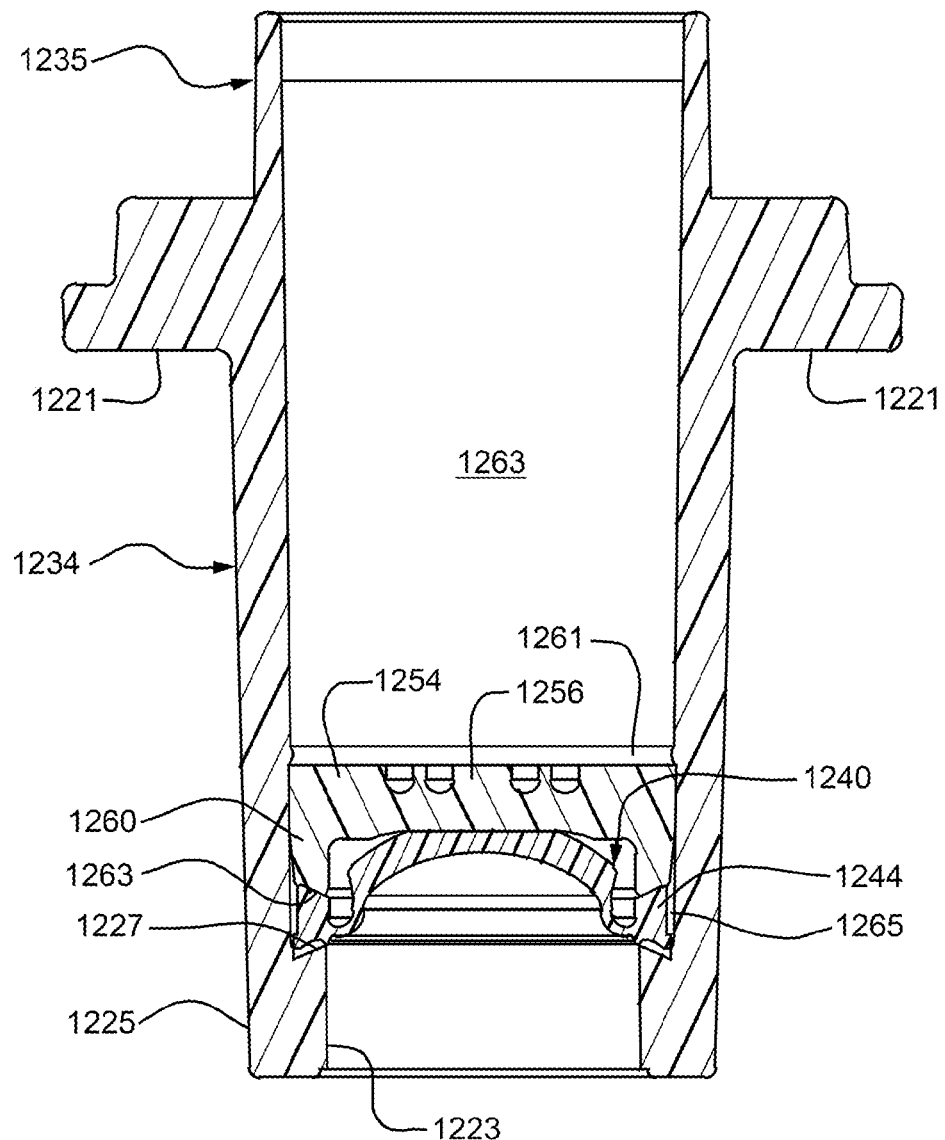
FIG. 26 is a side cross-sectional view taken along the lines 26-26 appearing in FIG. 25.
Figure 29:
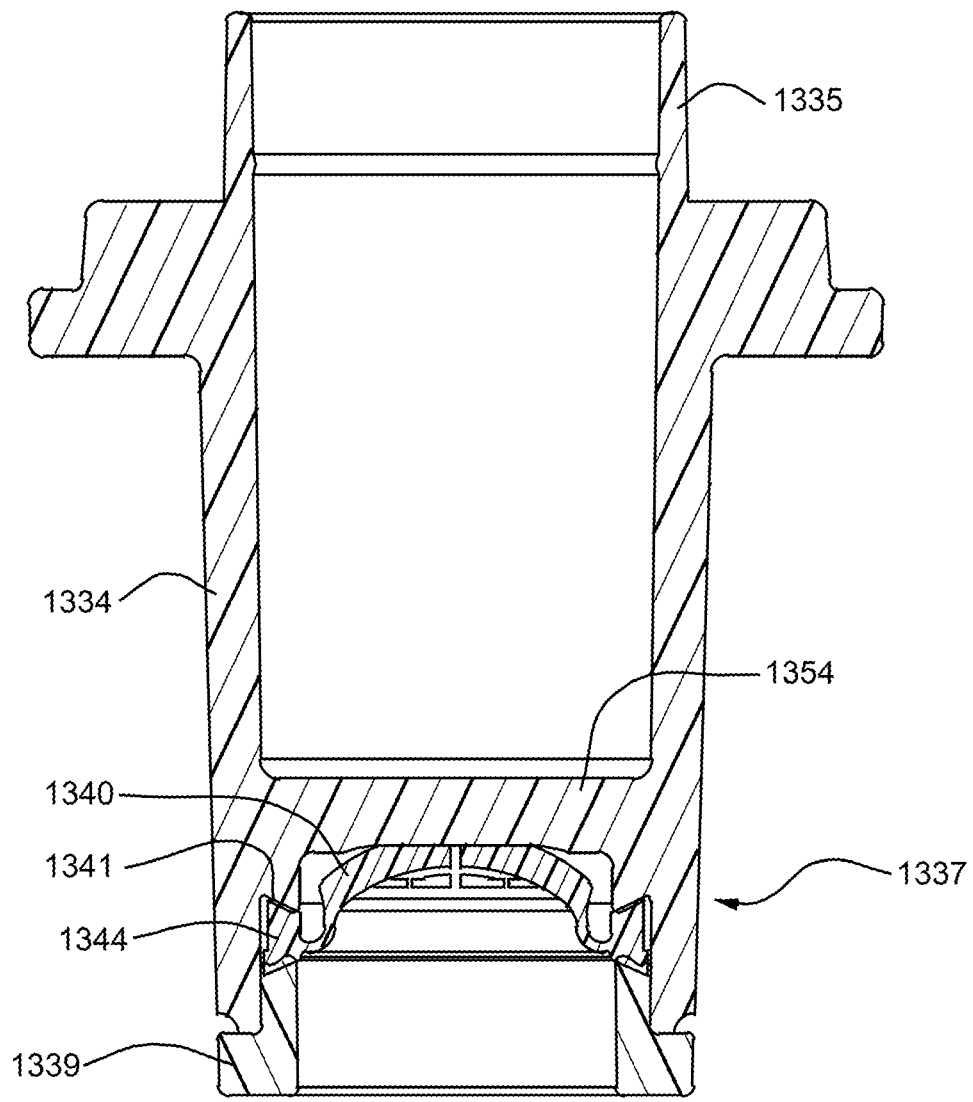
FIG. 29 illustrates a prior art nozzle tip having an external retainer ring.

In the depicted preferred embodiment, as can be seen in FIG. 26, the valve peripheral edge 1244 has a generally tapered or dovetailed cross-sectional shape and the shoulder 1227 and downward facing surface 1263 of the annular wall 1260 cooperate to define a complimentary annular recess or channel 1265 for secure retention of the valve peripheral edge 1244. The rib 1261 may be positioned such that the vent-resistant member 1254 compresses the valve peripheral edge 1244 to provide a sealing engagement therebetween to prevent fluid from flowing around the valve member 1240.

The annular sidewalls 1260 may be slightly inwardly tapered to facilitate axially sliding movement of the member 1254 past the rib 1261 and into the locked position to assemble the unit. The baffle 1256 is adjacent to the inward facing surface of the valve member 1240 to prevent the valve flaps from opening inwardly, thereby preventing venting of ambient air following a dispensing operation.

The invention has been described with reference to the preferred embodiments. Modifications and alterations will occur to others upon a reading and understanding of the preceding detailed description. It is intended that the invention be construed as including these and other modifications and alterations.

Having thus described the preferred embodiments, the invention is now claimed to be:

1. An outlet valve assembly for a fluid dispenser, the fluid dispenser having a pump fluidically coupled to a fluid reservoir, said outlet valve assembly comprising:
   an outlet nipple having a proximal end configured to be fluidically coupled to the pump and a distal end opposite the proximal end, the outlet nipple defining a conduit extending in a flow direction and having an annular protrusion extending radially inwardly intermediate the proximal end and the distal end;
   an outlet nozzle coaxially received within the distal end of the outlet nipple; and
   a resiliently deformable valve member received within said conduit, said valve member including a valve head portion having one or more slits defining an orifice and a peripheral valve portion outward of said valve head portion, said peripheral valve portion retained between the annular protrusion of the outlet nipple and an end edge surface of the outlet nozzle.

2. The outlet valve assembly of claim 1, further comprising:
   said valve head portion having a first side and a second side opposite the first side, said first side being upstream of said second side in the flow direction; and
   a vent-resisting member received within the conduit defined by the outlet nipple conduit, the vent-resisting member including a perforated baffle adjacent the first side of said valve head portion, wherein the baffle is positioned sufficiently close to the first side of said valve head portion so as to resist inward opening of said orifice during operation to prevent inward venting of ambient air during a dispensing operation.

3. The outlet valve assembly of claim 2, wherein the first side of said valve head portion is spaced apart from said baffle.

4. The outlet valve assembly of claim 2, wherein said vent-resisting member is integral with the outlet nipple.

5. The outlet valve assembly of claim 2, wherein the vent resisting member includes an axially extending annular sidewall extending between the perforated baffle and a peripheral flange, and further wherein the peripheral flange is retained along with the peripheral valve portion between the annular protrusion of the outlet nipple and the end edge surface of the outlet nozzle.

6. The outlet valve assembly of claim 1, wherein the outlet nozzle is secured within the outlet nipple via a friction fit.

7. The outlet valve assembly of claim 1, further comprising one or both of:
one or more protrusions formed on an outward facing surface of the outlet nozzle engaging one or more complementary recesses formed on an inward facing surface of the outlet nipple; and
one or more protrusions formed on an inward facing surface of the outlet nipple engaging one or more complementary recesses formed on an outward facing surface of the outlet nozzle.

8. The outlet valve assembly of claim 1, wherein said first surface of said valve head portion is generally convex.

9. The outlet valve assembly of claim 1, wherein said valve member is formed of a material selected from silicone rubber, neoprene, chloroprene rubber, and ethylene propylene diene terpolymer (EPDM).

10. The outlet valve assembly of claim 1, wherein said peripheral valve portion has a generally dovetailed cross-sectional shape.

11. The outlet valve assembly of claim 1, wherein said valve peripheral portion is clamped between the annular protrusion of the outlet nipple and the end edge surface of the outlet nozzle to provide a sealing interference therebetween.

12. A fluid dispenser comprising a pump having a pump inlet fluidically coupled to a fluid reservoir and an outlet valve assembly, said outlet valve assembly comprising:
an outlet nipple having a proximal end configured to be fluidically coupled to the pump and a distal end opposite the proximal end, the outlet nipple defining a conduit extending in a flow direction and having an annular protrusion extending radially inwardly intermediate the proximal end and the distal end;
an outlet nozzle coaxially received within the distal end of the outlet nipple; and
a resiliently deformable valve member received within said conduit, said valve member including a valve head portion having one or more slits defining an orifice and a peripheral valve portion outward of said valve head portion, said peripheral valve portion retained between the annular protrusion of the outlet nipple and an end edge surface of the outlet nozzle.

13. The fluid dispenser of claim 12, wherein said fluid reservoir is selected from the group consisting of a flexible non-vented container, a semi-rigid non-vented container, a rigid vented container, and a semi-rigid vented container.

14. The fluid dispenser of claim 12, wherein said pump is selected from a tube pump and a dome pump.

15. The fluid dispenser of claim 12, further comprising:
a housing for receiving said pump and fluid reservoir; and
a pump actuator on said housing.

16. The fluid dispenser of claim 12, further comprising:
said valve head portion having a first side and a second side opposite the first side, said first side being upstream of said second side in the flow direction; and
a vent-resisting member received within the conduit defined by the outlet nipple conduit, the vent-resisting member including a perforated baffle adjacent the first side of said valve head portion, wherein the baffle is positioned sufficiently close to the first side of said valve head portion so as to resist inward opening of said orifice during operation to prevent inward venting of ambient air during a dispensing operation.

17. The fluid dispenser of claim 12, wherein the first side of said valve head portion is spaced apart from said baffle.

18. The fluid dispenser of claim 12, wherein said valve member is formed of a material selected from silicone rubber, neoprene, chloroprene rubber, and ethylene propylene diene terpolymer (EPDM).

19. The fluid dispenser of claim 12, wherein said valve peripheral portion is clamped between the annular protrusion of the outlet nipple and the end edge surface of the outlet nozzle to provide a sealing interference therebetween.

20. The fluid dispenser of claim 12, wherein the outlet nozzle is secured within the outlet nipple via any one or more of:
a friction fit;
one or more protrusions formed on an outward facing surface of the outlet nozzle engaging one or more complementary recesses formed on an inward facing surface of the outlet nipple; and
one or more protrusions formed on an inward facing surface of the outlet nipple engaging one or more complementary recesses formed on an outward facing surface of the outlet nozzle.

* * * * *